US008205070B2

(12) United States Patent
Toelkes (10) Patent No.: US 8,205,070 B2
(45) Date of Patent: Jun. 19, 2012

(54) DEVICE BOOTUP FROM A NAND-TYPE NON-VOLATILE MEMORY

(75) Inventor: Tahoma M. Toelkes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 473 days.

(21) Appl. No.: 12/555,306

(22) Filed: Sep. 8, 2009

(65) Prior Publication Data

US 2011/0060897 A1 Mar. 10, 2011

(51) Int. Cl.
*G06F 15/177* (2006.01)
(52) U.S. Cl. .................................. 713/2; 713/1; 711/103
(58) Field of Classification Search ........................ None
See application file for complete search history.

(56) References Cited

U.S. PATENT DOCUMENTS

| 2009/0138754 A1* | 5/2009 | Edwards et al. | 714/6 |
| 2010/0180068 A1* | 7/2010 | Matsumoto et al. | 711/103 |
| 2010/0235831 A1* | 9/2010 | Dittmer | 718/1 |

* cited by examiner

*Primary Examiner* — Dennis M Butler
(74) *Attorney, Agent, or Firm* — Kramer Levin Naftalis & Frankel LLP (57) ABSTRACT

Systems and methods are provided for using a NAND-type non-volatile memory ("NVM"), such as NAND flash memory, to store NV pre-boot information for a bootloader (e.g., a second state bootloader) or an operating system. The NV pre-boot information can include, for example, environment variables storing the configuration or state of an electronic device. In some embodiments, an electronic device including the NAND-type NVM may allocate a portion of the super blocks in the NAND-type NVM to storing the NV pre-boot information. The electronic device may store a redundant copy of the NV pre-boot information into the allocated portion of each IC die of the NAND-type NVM.

26 Claims, 5 Drawing Sheets

DEVICE BOOTUP FROM A NAND-TYPE NON-VOLATILE MEMORY

FIELD OF THE INVENTION

This can relate to systems and methods for using a NAND-type non-volatile memory, such as a NAND flash memory, to store non-volatile pre-boot information for booting up an electronic device.

BACKGROUND OF THE DISCLOSURE

NAND flash memory, as well as other types of NAND-type non-volatile memories ("NVMs"), are commonly used in electronic devices for mass storage. For example, consumer electronics such as portable media players often include NAND flash memory to store music, videos, and other media programs.

Electronic devices can also include other types of storage modules. For example, consumer electronics often employ NOR flash memory to store information used by the device on power-up or reboot. The information may include environment variables that maintain the configuration and state of the electronic device, for example.

SUMMARY OF THE DISCLOSURE

Systems and methods are provided for storing non-volatile ("NV") pre-boot information in a NAND-type non-volatile memory, such as a NAND flash memory. This way, the NAND-type non-volatile memory can be used for a variety of purposes, such as for mass storage and for bootup purposes, and other physical storage modules (e.g., NOR flash memory) may not be needed on the electronic device.

In some embodiments, an electronic device is provided that may include a system-on-a-chip and a NAND-type non-volatile memory ("NVM"). The NAND-type NVM may include a NAND flash memory, for example, or any other suitable type of non-volatile memory having memory cells fabricated in a NAND-type configuration (e.g., series-coupled memory cells).

The system-on-a-chip can include a NVM interface for accessing the NAND-type non-volatile memory. The NVM interface can include any suitable combination of software or firmware memory drivers and hardware for communicating with the NAND-type non-volatile memory. The NVM interface can perform access operations (e.g., read and program operations) in response to commands received from an application, operating system (e.g., via a file system), or a boot manager, for example.

On power-up or reboot of the electronic device, the boot manager may load a program referred to sometimes as a "first stage bootloader" from the NAND-type NVM into memory. The first stage bootloader may in turn load a program sometimes referred to as a "second stage bootloader" from the NAND-type NVM into memory. The second stage bootloader may be configured to load the device's kernel and operating system into memory. The first and/or second stage bootloaders may operate based on NV pre-boot information stored in the NAND-type NVM. The NV pre-boot information can include any NV pre-boot data provided by one instance of the operating system (e.g., in a previous boot) for use in the next instance of the operating system (e.g., a current boot) as well as any metadata used to manage the physical storage of the NV pre-boot data in the NAND-type NVM. For example, the NV pre-boot information can include environment variables that maintain the configuration of the electronic device (e.g., the operating system).

The NVM interface, via a NV pre-boot storage driver, may store the NV pre-boot information in the NAND-type NVM in a separate partition than the first and second stage bootloaders. For example, the NAND-type NVM may include multiple integrated circuit ("IC") die, and each IC die may include a sequence of blocks. A first portion of the blocks in each IC die (e.g., one or more super blocks) may be allocated to storing the first stage bootloader, a second portion of the blocks in each IC die (e.g., one or more super blocks) may be allocated to storing NV pre-boot information (e.g., environment variables, metadata, etc.), and a third portion of the blocks in each IC die (e.g., one or more super blocks) may be allocated for storing the second stage bootloader and other firmware images, for example.

The NVM interface may be configured to store the NV pre-boot information in the NAND-type non-volatile memory in response to receiving a request from the operating system to commit any changes made to a NV pre-boot storage (e.g., during a reboot or shutdown process). The version of the NV pre-boot information being committed to the NAND-type NVM may be referred to as the "current version" or "current generation" of the NV pre-boot information. In some embodiments, in response to receiving the commit request, the NVM interface may be configured to store a redundant copy of the current version of the NV pre-boot information in each of the IC die. For example, for each IC die, the NVM interface may locate the next available memory location (e.g., page or set of pages) amongst the blocks partitioned for NV pre-boot storage, and may store the current version of the NV pre-boot information in the identified memory location. In some operating scenarios, for one more of the IC die, the NVM interface may store the current version of the NV pre-boot information in the same block as the previous version of the NV pre-boot information.

Some NAND-type non-volatile memories, such as NAND flash memory, may have memory cells that may initially be defective, become defective through use (e.g., from many erase cycles), or presently suffer from a disturb problem (e.g., read disturb). Storing multiple redundant copies of the NV pre-boot information therefore enables the NVM interface to achieve high storage reliability despite the possible presence of defects or disturb issues. Also, by allocating a suitable number of blocks of each IC die to the NV pre-boot storage partition, many versions of the NV pre-boot information can be stored in the partition before an erase cycle becomes necessary for any particular block. This way, the NVM interface can prolong the overall life of the partition.

During bootup of the electronic device, the NVM interface can retrieve the current version of the NV pre-boot information from the NAND-type NVM. For example, the NVM interface may retrieve the current version in response to a request to read from the NV pre-boot storage issued by the second stage bootloader or the operating system. At bootup, the NVM interface may not have information on where the current version is stored in each IC die of the NAND-type NVM or even the state (e.g., erased or programmed) of the memory locations in the NV pre-boot storage partition of the NAND-type NVM. To find the current version, the NVM interface may examine the blocks of the NV pre-boot storage partition for each of the IC die. In some embodiments, to aid the search for the current version, the NVM interface may use the last page or pages of each block (referred to sometimes as the "closing index") to indicate whether the block potentially includes the current version of the NV pre-boot information.

Of the various generations of NV pre-boot information stored in the NAND-type NVM, the current generation may be the overall youngest generation stored in the NAND-type NVM. Thus, for each block that potentially includes the current version, the NVM interface may scan through the block in reverse order until a valid version of the NV pre-boot information is identified, which may be the youngest of the valid versions available in that block. From the valid versions identified from each block (if available), the NVM interface may use the overall youngest valid version as the current version of the NV pre-boot information.

BRIEF DESCRIPTION OF THE DRAWINGS

The above and other aspects and advantages of the invention will become more apparent upon consideration of the following detailed description, taken in conjunction with accompanying drawings, in which like reference characters refer to like parts throughout, and in which.

DETAILED DESCRIPTION OF THE DISCLOSURE

Figure 1:
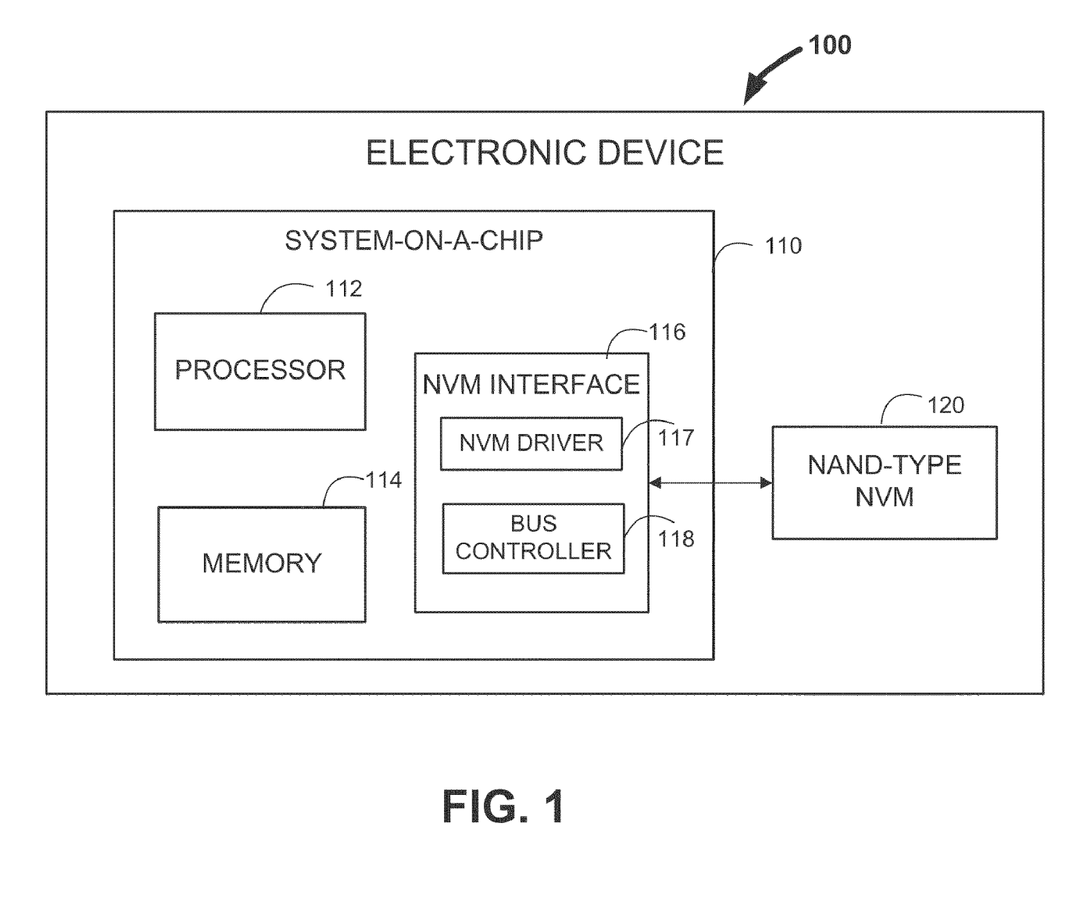
FIG. 1 is a schematic view of an electronic device having a NAND-type non-volatile memory and configured in accordance with various embodiments of the invention.

FIG. 1 is a schematic view of electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device.

Electronic device 100 can include system-on-a-chip ("SoC") 110 and NAND-type non-volatile memory ("NVM") 120. NAND-type NVM 120 can include any combination of NAND flash memory based on floating gate or charge trapping technology, a NAND-type erasable programmable read only memory ("EPROM"), a NAND-type electrically erasable programmable read only memory ("EEPROM"), a NAND-type ferroelectric RAM ("FRAM"), a NAND-type magnetoresistive RAM ("MRAM"), or any other known or future types of non-volatile memory having memory cells coupled in a NAND-type configuration. NAND-type NVM 120 can include multiple integrated circuit ("IC") die. Each IC die can include multiple "blocks," where the memory locations in each block may be erased in a single erase operation. The blocks from a corresponding position along each die (e.g., blocks having the same position or block number) may form units referred to as "super blocks." Each block may be organized into multiple "pages" that may each be programmable and readable at once. Each memory location of NVM 120 (e.g., a page, group of pages, a block, or group of blocks) can be addressed using a physical address (e.g., a physical page address or physical block address). While electronic device 100 is illustrated as having only one NVM 120 package, it should be understood that multiple packages of non-volatile memories may be included in electronic device 100.

FIG. 1, as well as later figures and various disclosed embodiments, may sometimes be described in terms of using NAND flash technology. However, this is not intended to be limiting, and any other type of NAND-type non-volatile memory can be implemented instead. Electronic device 100 can include other components, such as a power supply, any user input or output components, or any other memory or storage modules which are not depicted in FIG. 1 to prevent overcomplicating the figure.

System-on-a-chip 110 can include processor 112, memory 114, and NVM interface 116. Processor 112 can control the general operations and functions of electronic device 100 and can include one or more processors of any suitable type, such as any suitable combination of conventional processors, microprocessors, and any processors developed in the future. Processor 112 may operate under the control of a program, such as an application, operating system, NVM driver 117, or a boot manager (e.g., from a boot read-only memory ("ROM") (not shown)) loaded in memory 114.

Memory 114 can include any suitable type of memory module, such as dynamic random access memory ("DRAM"), synchronous dynamic random access memory ("SDRAM"), double-data-rate RAM ("DDR RAM"), cache memory, or any combination thereof. Memory 114 may act as the main memory for processor 112 and can include a data source that can temporarily store data for programming into or reading from NAND-type non-volatile memory 120.

NVM interface 116 may include any suitable combination of hardware, software, and/or firmware configured to act as an input/output interface between NAND-type non-volatile memory 120 and the operating system, application, boot manager, or other non-memory-specific or non-vendor-specific programs executed by processor 112. NVM interface 116 may include NVM driver 117 and bus controller 118.

NVM driver 117 may include NVM-specific or vendor-specific software and/or firmware for interpreting memory access commands from a program. In some embodiments, NVM driver 117 can include multiple software modules or drivers that provide access to different portions of NAND-type NVM 120. For example, NVM driver 117 can include a block device driver for providing access to at least some of the memory locations in NAND-type NVM 120 through a file system and a separate non-volatile pre-boot storage driver for providing access to NV pre-boot information stored in other memory locations in NVM 120. NV pre-boot information, discussed in greater detail below, can include information used by electronic device 100 during boot up.

NVM driver 117 can further include various software modules or drivers to provide a layered software interface between the operating system, for example, and the physical NAND-type NVM 120. NVM driver 117 can include lower level software modules that interface with NAND-type NVM 120 and abstract away details of the physical NAND-type NVM 120 from higher level software modules of NVM driver 117, the operating system, and any applications. The lower level software modules can include, for example, drivers that group blocks of NAND-type NVM 120 into super blocks for use by the higher level software modules. The lower level software modules can also include a NV pre-boot storage driver (discussed below).

Bus controller 118 may include any suitable hardware components that enable NVM driver 117 to access NAND-type NVM 120 using the bus specifications (e.g., data rate) of NVM 120.

For simplicity, NVM interface 116 may embody any components of system-on-a-chip 110 that are specific to the memory type of NVM 120 and/or the vendor of NVM 120. In some embodiments, at least some components of NVM interface 116 may be integrated or work directly with other components of system-on-a-chip 110. For example, NVM driver 117 may be loaded into memory 114 and executed by processor 112. Therefore, the term "NVM interface" may sometimes be used to generally refer to any of the components in an electronic device that maps information from a logical storage device (e.g., a "NV pre-boot storage," discussed below) onto a specific physical NAND-type NVM and/or enables access to a physical NAND-type NVM. In some embodiments, which are not depicted in FIG. 1, NVM driver 117 and/or bus controller 118 may be implemented in a separate memory controller (e.g., flash controller) for NAND-type NVM 120, such as in a flash card.

Electronic device 100 may be configured to boot up an operating system from NAND-type non-volatile memory 120 during power-up or reboot of electronic device 100. In particular, on power-up or reboot, a bootloader may be loaded from NAND-type NVM 120 into memory 114 through NVM interface 116. The bootloader, which can include a first stage and a second stage bootloader, may be configured to load and initiate the kernel for the operating system. Data used by the bootloader or the operating system to start up and configure the operating system may be loaded into memory 114 from NAND-type NVM 120 through NVM interface 116 instead of from a separate storage module (e.g., NOR flash memory). In general, the non-volatile data used during bootup of the operating system may be referred to as "non-volatile pre-boot data."

The non-volatile ("NV") pre-boot data may include any data that is not stored using a typical block device or file system approach, which may be saved by one instance of the operating system for use in booting up a later instance of the operating system. For example, the NV pre-boot data may include any status, state (e.g., error or panic information), or environment information used during the bootup process (e.g., before the operating system is fully loaded), such as environment variables that maintain the configuration of electronic device 100. Thus, the NV pre-boot data may be referred to as "NV" or "non-volatile" because the operating system expects persistent storage of the NV pre-boot data, and as "pre-boot" data because the data may be used before the operating system has fully booted up.

NVM interface 116 (e.g., via a NV pre-boot storage driver implemented as part of NVM driver 117) may provide the operating system with the ability to access the NV pre-boot data via an abstract storage construct referred to sometimes as an "NV pre-boot storage." For example, on power-up or reboot, the operating system and bootloader may access the NV pre-boot data by issuing read requests to the NV pre-boot storage. On power-down or reboot, the operating system may store the NV pre-boot data by requesting that changes made to the NV pre-boot storage be committed. In response to such access requests to the NV pre-boot storage, NVM interface 116 (e.g., via a NV pre-boot storage driver) may store NV pre-boot data in or retrieve NV pre-boot data from NAND-type NVM 120.

In some embodiments, to manage the storage of NV pre-boot data, NVM interface 116 (e.g., via a NV pre-boot storage driver) may generate metadata referred to sometimes as "NV pre-boot metadata." The NV pre-boot metadata can include generation/version information on the NV pre-boot data being committed or retrieved, error control data to ensure reliable storage of the NV pre-boot information, and any other suitable metadata. NVM interface 116 may store both NV pre-boot data and at least some of the NV pre-boot metadata in NAND-type NVM 120. This stored information may sometimes be referred to as "NV pre-boot information," which may or may not include both NV pre-boot data and NV pre-boot metadata. Thus, for example, a NV pre-boot storage driver may respond to a request to commit changes to the NV pre-boot storage by generating NV pre-boot metadata for the updated NV pre-boot data and programming the NV pre-boot data and metadata into an available memory location in the NAND-type NVM 120. Various techniques that NVM interface 116 (e.g., via an NV pre-boot storage driver) may use to store NV pre-boot information into NAND-type NVM 120 are described below in connection with FIGS. 2-4.

Figure 2:
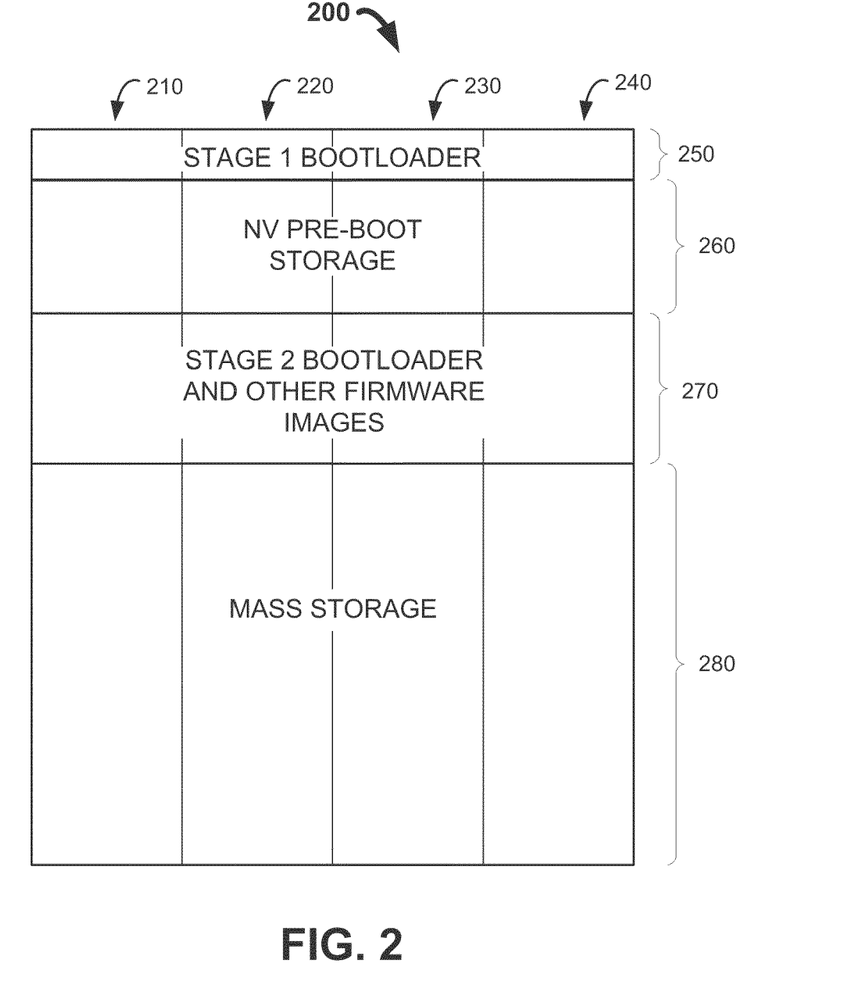
FIG. 2 is graphical view of partitions in a NAND-type non-volatile memory in accordance with various embodiments of the invention.

FIG. 2 is a graphical view of NAND-type non-volatile memory 200, which may or may not illustrate one embodiment of NAND-type NVM 120 of FIG. 1. The first, second, third, and fourth columns of FIG. 2 represent memory locations (e.g., pages and blocks) of IC die 210, IC die 220, IC die 230, and IC die 240, respectively. While four IC die are illustrated, it should be understood that any suitable number of IC die may be included in NVM 200 and that not all of the IC die in NVM 200 are necessarily used in the partitioning scheme discussed below.

NVM 200 can include a number of partitions, such as partitions 250, 260, 270, and 280. Each of these partitioned may include a number of blocks from each of IC die 210, 220, 230, and 240. For example, partition 250 may include one block from each of IC die 210, 220, 230, and 240. As illustrated in FIG. 2, the blocks allocated to a particular partition may belong to the same set of super blocks.

Partitions 250, 260, 270, and 280 may be partitioned virtually (e.g., using software or firmware) instead of physically (e.g., by formatting NAND-type NVM 200). For example, as described in greater detail below, different software modules may be used to control each partition.

NVM 200 can include partition 250, referred to sometimes as a "boot1 partition," for storing a first stage bootloader and for storing NVM-specific and/or vendor-specific information about NVM 200 (e.g., the size of each partition, the address of the first block in each partition, etc.). For example, boot1 partition 250 can include a program that is first loaded and run on power-up of an electronic device (e.g., electronic device 100 of FIG. 1). The first stage bootloader may be configured to, for example, load a second stage bootloader stored in partition 270, referred to sometimes as a "boot2 partition." In addition to the second stage bootloader, boot2 partition 270 may be used to store any other suitable firmware images used by the electronic device to complete the bootup process.

Partition 260, sometimes referred to as a "NV pre-boot storage partition," may be used by an electronic device (e.g., electronic device 100 of FIG. 1) to store NV pre-boot information, such as environment variables that maintain the configuration and state of the electronic device. The memory locations of NV pre-boot storage partition 260 may be controlled by a NV pre-boot storage driver (e.g., implemented as part of NVM driver 117 of NVM interface 116 (FIG. 1)). An example of how an NVM driver may configure and use a NV pre-boot storage partition will be described in detail below in connection with FIG. 3.

Partition 280, sometimes referred to as a "mass storage partition," can be used for general or mass storage (e.g., for storing music, video, or other media elements). In some embodiments, partition 280 may be accessed by an application or the operating system using a block device driver (e.g., implemented as part of NVM driver 117 of FIG. 1) through a file system, for example.

It should be understood that the partitions depicted in FIG. 2 are merely illustrative. For example, the depicted size of each partition is illustrative and should not be viewed as limiting embodiments to the depicted size. Also, it should be understood that the order of the partitions may be rearranged into any suitable order.

Figure 3:
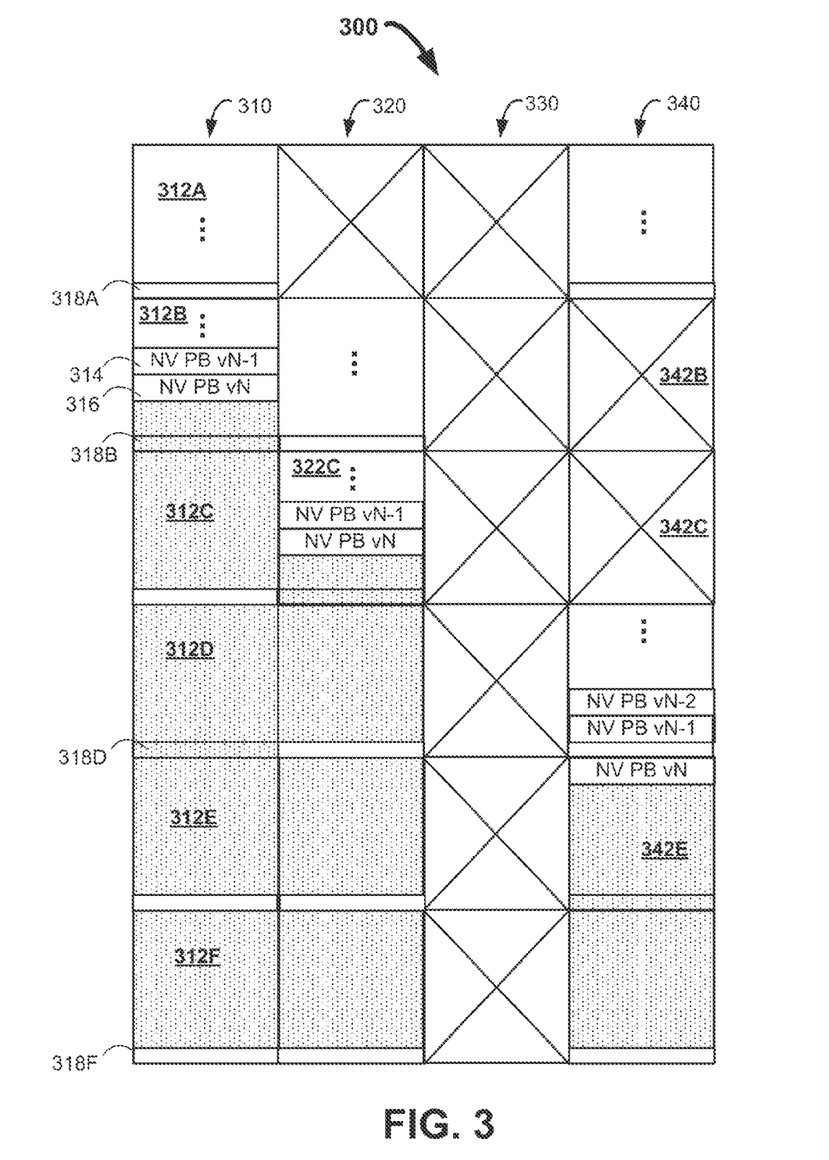
FIG. 3 is a graphical view of memory locations in a NV pre-boot storage partition of a NAND-type non-volatile memory in accordance with various embodiments of the invention.

FIG. 3 is a graphical view of illustrative NV pre-boot storage partition 300, which may or may not be a more detailed view of NV pre-boot storage partition 260 of NAND-type non-volatile memory 200 (FIG. 2). In the example of FIG. 3, NV pre-boot partition 260 can include four integrated circuit dies 310, 320, 330, and 340, where each of the IC die may include a sequence of six blocks. For example, IC die 310 can include a sequence of blocks 312A, 312B, 312C, 312D, 312E, and 312F. Each row of blocks shown FIG. 3 may represent a super block of the non-volatile memory.

A NVM interface, such as NVM interface 116 of FIG. 1, may store at least one redundant copy of a current version of NV pre-boot information in each IC die that has usable blocks. The current version of the NV pre-boot information is referred to in FIG. 3 as "NV PB vN," and may correspond to an updated NV pre-boot data (along with corresponding metadata) that an operating system may commit during a reboot or shutdown process, for example. As illustrated in FIG. 3, the NVM interface may store the current version of the NV pre-boot information in block 312B of IC die 310 (e.g., at memory location 316), block 322C of IC die 320, and block 342E of IC die 340. By storing the NV pre-boot information into different IC dies, the NVM interface may still be able to recover the NV pre-boot information even if the hardware (e.g., charge pumps, etc.) for one or more of the IC dies stops functioning properly.

In some embodiments, the NVM interface may store the current version of the NV pre-boot information multiple times in each IC die to further increase storage reliability (e.g., two times, three times, four times, etc.). Also, memory location 316, where the current version of the NV pre-boot information may reside in IC die 310, may include one or more pages, and may include sufficient storage space to commit a NV pre-boot storage used by the operating system and any corresponding NV pre-boot metadata.

The blocks crossed out with an "X" in FIG. 3 may represent blocks that have been marked as bad blocks. Because bad blocks may not reliably store data, the NVM interface may avoid storing NV pre-boot information in these blocks. FIG. 3 illustrates a scenario where, through use, IC die 330 may no longer include any usable blocks. IC die 330, therefore, may not be used by the NVM interface to store NV pre-boot information, thereby leaving the NVM interface with three IC die within partition 300 in which to store NV pre-boot information. The NVM interface may need only one of the IC die to have usable blocks in partition 300 to enable operation of the electronic device. Therefore, for the time being, having three IC die (or even two or one IC die) to work with instead of four may not adversely affect the ability of the electronic device to properly bootup.

NAND-type NVMs may degrade and develop bad blocks due to the effects of performing a large number of erase cycles. Therefore, to decrease the frequency of erase cycles, the NVM interface may store multiple versions or generations of the NV pre-boot information in an IC die before erasing any of the obsolete versions. For example, FIG. 3 illustrates NAND-type NVM 300 with multiple versions of the NV pre-boot information, and not just the current version (i.e., NV PB vN). A previous version of the NV pre-boot information, which may immediately precede the current version, is referred to in FIG. 3 as "NV PB vN-1." A version immediately preceding NV PB vN-1 is referred to in FIG. 3 as "NV PB vN-2," and so on. Thus, since the NVM interface may need to store a new version of the NV pre-boot information in partition 300 during each shutdown or reboot process, the NVM interface can delay performing erase operations until many reboot or shutdown processes have occurred.

In some embodiments, the NVM interface may store a current version of the NV pre-boot information in a memory location following the memory location in which the immediately preceding version is stored. For example, the NVM interface may store NV PB vN in memory location 316, which may directly follow memory location 314 in which NV PB vN-1 may be stored (as long as memory location 316 passes a readback verification process). Thus, starting with an erased IC die, the NVM interface may fill the IC die from top to bottom. For example, as the operating system continues to commit the NV pre-boot storage on each shutdown or reboot, the NVM interface may fill IC die 310 from the first page or set of pages in block 312A to the last page or set of pages in block 312F, avoiding any bad blocks. In FIG. 3, the shaded regions represent the erased memory locations in NV pre-boot storage partition 300 that have yet to be filled, and the unshaded regions represent programmed memory locations in partition 300 that may store different versions of the NV pre-boot information.

After all of the blocks in an IC die have been used to store different generations of the NV pre-boot information, the NVM interface may wrap back around to store a new version of the NV pre-boot information in the first block (e.g., block 312A). The NVM interface may erase the first block and may store the current version in the first memory location (e.g., page or set of pages) of the first block. The NVM interface, therefore, may not need to perform an erase cycle on the first block (or any of the other blocks) until all of the memory locations in each block of the IC die have been used. This can reduce the frequency of erase cycles per block by a significant amount, where the amount may depend on the number of super blocks in the NAND-type non-volatile memory allocated to partition 300.

Thus, NV pre-boot storage partition 300 can include any suitable number of super blocks, and not just the number depicted in FIG. 3, to affect the number of erase cycles expected per block during the lifetime of the electronic device. In some embodiments, the number of blocks may be allocated such that NV pre-boot storage partition 300 is expected to maintain integrity throughout the lifetime of the device. The number of blocks may be based, for example, on the expected lifetime of the electronic device, the number of program operations expected (e.g., one program operation per boot), the expected frequency of boots (e.g., once per hour), the number of erase cycles that the particular type of NVM is expected to withstand before becoming defective (e.g., 5,000 erase cycles for some NAND flash memories), or any other factors. Thus, even though a NAND-type NVM may not be able to endure as many erase cycles as other types of non-volatile memories (e.g., NOR flash), an electronic device may still be able to reliably use a NAND-type NVM to store NV pre-boot information as long as a sufficient number of super blocks are allocated to NV pre-boot storage partition 300.

On power-up of the electronic device, the NVM interface may retrieve the current version of the NV pre-boot information from NV pre-boot storage partition 300 for use by the device's bootloader (e.g., second stage bootloader) or operating system, for example. Initially on power-up, the NVM interface may not have information on where the current version of the pre-boot information is stored or even the program/erase status of the memory locations in NV pre-boot storage partition 300. The NVM interface may scan through the memory locations of each die to identify the memory location of the current version.

In some embodiments, the NVM interface may scan through each block in each IC die in reverse order to identify the memory location with the current version of the NV pre-boot information. Using a reverse order, the NVM interface may scan through the memory locations of a block that do not store valid versions of the NV pre-boot information (e.g., due to being in an erased state and returning all ones for NAND flash memory) until the NVM interface finds a valid version of the NV pre-boot information (if available in that block). The first valid version of the NV pre-boot information that the NVM interface comes across in a block during a reverse-order scan may be the youngest version maintained in that block, and therefore may potentially be the current version of the NV pre-boot information. However, as many blocks may be filled with only old versions of the NV pre-boot information, the NVM interface may compare the valid versions from each block in the IC die or in partition 300 to identify the overall youngest valid version. The NVM interface may use the overall youngest valid version as the current version of the NV pre-boot information.

It may be inefficient to scan through all of the usable blocks in an IC die for a valid version of the NV pre-boot information, as the current version may be stored in only one of the blocks. To prevent the NVM interface from having to scan through the memory locations (e.g., pages) of all of the usable blocks, the NVM interface may be configured to reserve the last page or set of pages in each block for use as a status indicator for the block. The last page or set of pages that are used for this purpose may be referred to herein as a "closing index." In some embodiments, the NVM interface may program a suitable value into the closing index to "seal" the closing index, thus indicating that the "sealed" block does not include the current version. The NVM interface may leave the closing index of a block that stores the current version of the NV pre-boot information in an erased state, thus leaving the closing index and the block "unsealed."

For example, looking to the closing indices in IC die 310, the NVM interface may initial seal the closing indices of blocks that are completely erased (e.g., blocks 312C, 312D, 312E, and 312F), since none of these blocks may include the current version of the NV pre-boot information. When the NVM interface starts using a block for storing NV pre-boot information, the NVM interface may first erase the block, effectively unsealing the closing index. The closing index may remain unsealed until the NVM interface determines, during a commit operation, that no additional generations of the NV pre-boot information can fit into the block. The NVM interface may then erase the next block (thereby unsealing its closing index), program the current generation of the NV pre-boot information into the next block, and seal the closing index of the original block. For example, at some previous time, the NVM interface may have sealed closing index 318A responsive to determining that NV pre-boot information does not fit into block 312A, and may erase block 312B for use in storing NV pre-boot information. Since block 312B still includes the current version of the NV pre-boot information (i.e., NV PB vN in memory location 316), closing index 318B may remain in an erased, unsealed state.

While the NVM interface may attempt to keep all but one of the closing indices in an IC die sealed (e.g., all but closing index 318B sealed), this may not occur in actuality due to imperfections in the physical media. For example, the NVM interface may attempt to seal closing index 318D in order to indicate that block 312D does not contain the current version of the NV pre-boot information. However, as indicated in FIG. 3, the program operation to closing index 318D may fail, thereby leaving closing index 318D unsealed. Despite the possible inaccuracies in the state of one or more closing indices, using closing indices may nevertheless be more efficient.

When searching for the current version of the NV pre-boot information, instead of scanning through all the memory locations in all of the blocks in an IC die or partition 300, the NVM interface may examine the closing indices of the blocks one by one in backwards order (i.e., starting from closing index 318F) or in forwards order (i.e., starting from closing index 318A) to identify blocks having unsealed closing indices. In the example of FIG. 3, IC die 310 within partition 300 may include two blocks that satisfy this condition: block 312A and block 312D. The NVM interface may scan through the memory locations (e.g., pages) of block 312A and block 312D in backwards order to identify the youngest valid generation in each block. Since the NVM interface may not find any valid generations in block 312D (due to block 312 being erased), the NVM interface may be able to determine that block 312B stores the current version of the NV pre-boot information and that the current version resides at memory location 316.

Some of the IC dies in partition 300, such as IC die 330, may not properly store the current version of the NV pre-boot information. The NVM interface may, therefore, not attempt to identify the current version from searching through just one IC die. The NVM interface may instead search for the youngest generation across all of the IC dies in NV pre-boot storage partition 300. The NVM interface may use the youngest overall valid version of the NV pre-boot information as the current version to provide to the operating system or bootloader, for example.

Figure 4:
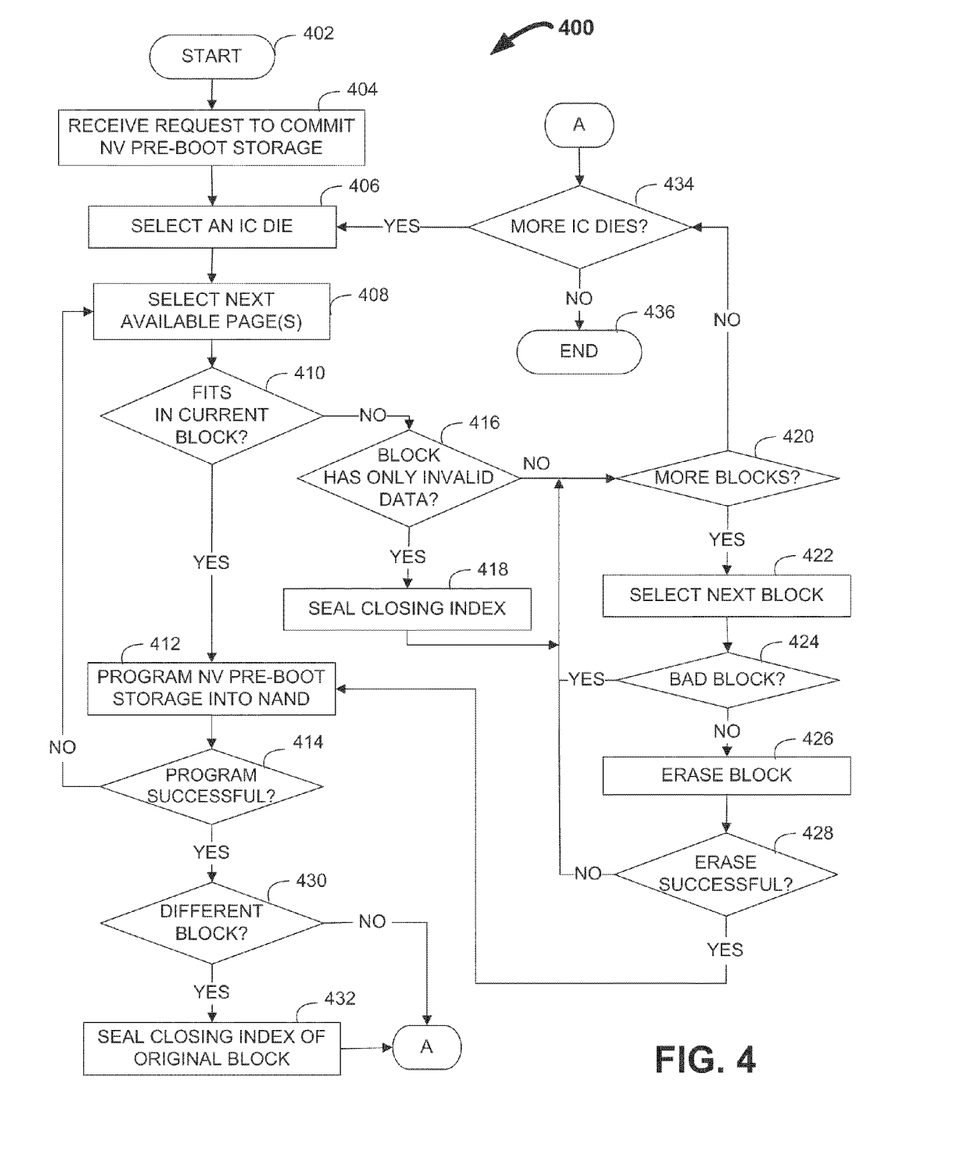
FIG. 4 is a flowchart of an illustrative process for storing NV pre-boot information in a NAND-type non-volatile memory in accordance with various embodiments of the invention.
Figure 5:
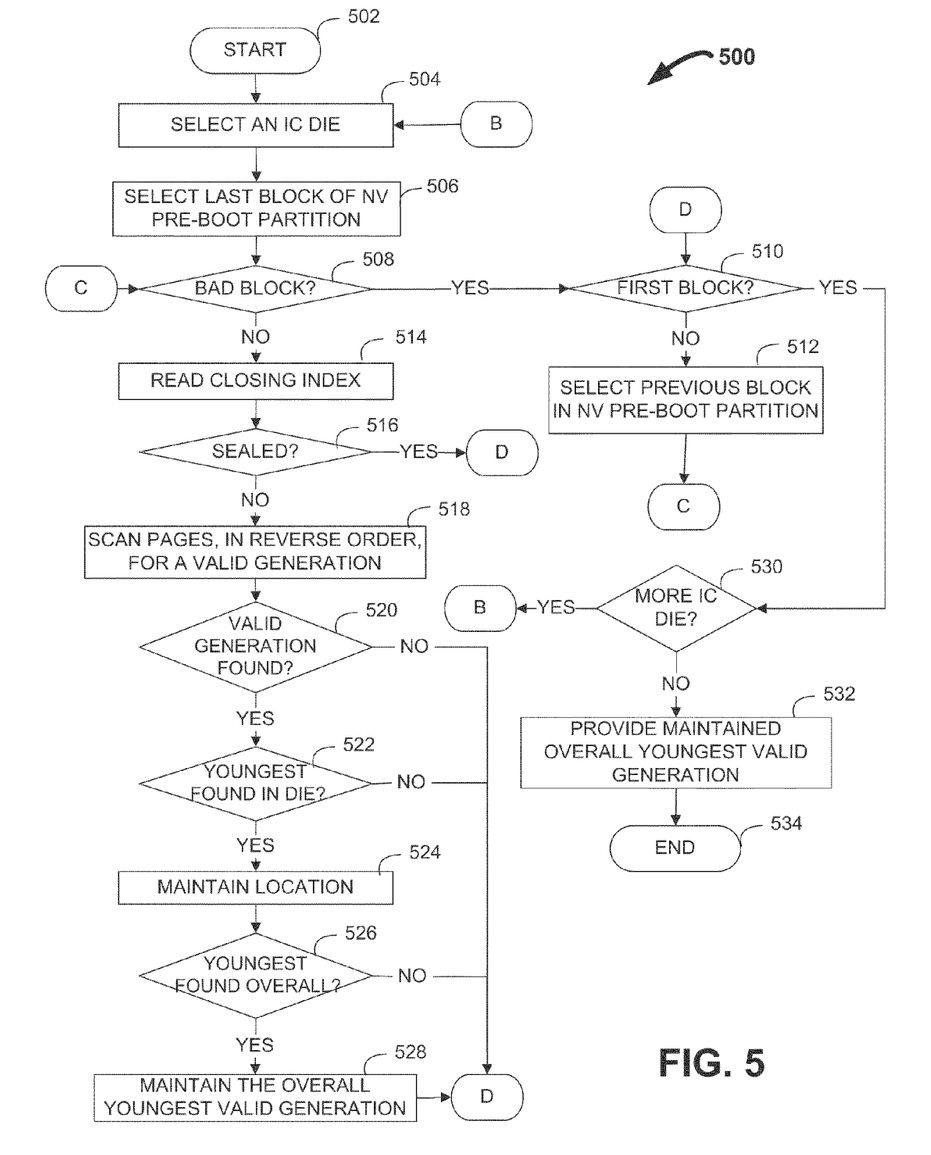
FIG. 5 is a flowchart of an illustrative process for reading NV pre-boot information from a NAND-type non-volatile memory in accordance with various embodiments of the invention.

Referring now to FIGS. 4 and 5, flowcharts of illustrative processes are shown for using a NAND-type non-volatile memory (e.g., NVM 120 of FIG. 1 or NVM 200 of FIG. 2), such as NAND flash memory, to implement a NV pre-boot storage. The steps of these processes may be executed by a NVM interface, such as NVM interface 116 of FIG. 1 (e.g., via a NV pre-boot storage driver), which can interface with the NAND-type non-volatile memory.

Turning first to FIG. 4, a flowchart of illustrative process 400 is shown for storing NV pre-boot information in a NAND-type non-volatile memory. The NV pre-boot information may be stored, for example, in a NV pre-boot storage partition (e.g., partition 260 of FIG. 2) of the NAND-type non-volatile memory. The NV pre-boot information may include, for example, environment variables that maintain the configuration and state of the electronic device, argument vectors that the second stage bootloader may pass to a kernel, panic information showing any errors or problems that have occurred in the operating system, and/or any other suitable boot parameters or data used before the operating system is fully booted.

Process 400 may begin at step 402. At step 404, the NVM interface may receive a request from an operating system, for example, to commit a NV pre-boot storage. The NVM interface may receive the commit request during a reboot or shutdown process, and the NVM interface may interpret the commit request as a request to store an updated (i.e., current) version or generation of NV pre-boot information into the NAND-type non-volatile memory. At step 406, the NVM interface may select an IC die in which to store the current version or generation of the NV pre-boot information.

After selecting an IC die at step 406, process 400 may continue to step 408, where the NVM interface may identify the next available (e.g., erased) memory location in the selected IC die, which may be used to store the current generation of the NV pre-boot information. The next available memory location may be a page or set of pages in the same block as a most recent previous version of the NV pre-boot information (e.g., NV PB vN). This block may be referred to as the "original block" and may presently be unsealed because the most recent previous version resides in the block.

Continuing to step 410, the NVM interface may determine whether the current generation may fit into the presently unsealed block in which the previous version of the NV pre-boot information is stored. This may involve determining whether the page or set of pages selected at step 408 encroaches into the pages of the block that may be reserved for a closing index. If the NVM interface determines that the current generation fits into the presently unsealed block, process 400 may continue to step 412. At step 412, the NVM interface may program the NV pre-boot information from the NV pre-boot storage into the NAND-type non-volatile memory, such as in the page or set of pages selected at step 408.

After programming the NV pre-boot information, the NVM interface may determine whether the program operation was successful at step 414. This may involve the NVM interface performing a readback of the programmed memory location and verifying the correctness of the readback data. If, at step 414, the NVM interface determines that the program operation was not successful, the programmed memory location may contain invalid data (e.g., data that does not match the format or other criteria expected of a valid generation of the NV pre-boot information). The NVM interface may therefore find another memory location in which to program the current generation. Process 400 may return to step 408, and the NVM interface may select the next available page or set of pages in the presently unsealed block (if available) to store the current generation. This way, if necessary, the NVM interface may continue moving from memory location to memory location in one or more blocks to find somewhere to store the current generation. In some operating scenarios, if many failed program operations occur, this may cause an entire block to contain only invalid data.

Returning to step 410, if the NVM interface determines that a current generation does not fit into a presently unsealed block, such as if the current generation would encroach into space reserved for a closing index, process 400 may move to step 416. At step 416, the NVM interface may determine whether the presently unsealed block stores only invalid data. If, at step 416, the NVM interface determines that the presently unsealed block contains only invalid data, the NVM interface may seal the closing index of the block at step 418 to indicate that the current generation of the NV pre-boot information could not be stored in that block. From step 418, or if the NVM interface determines at step 416 that the block does not contain only invalid data, process 400 may continue to step 420.

Process 400 may reach step 420, for example, when the current generation does not fit into the original block where the previous generation resides, or when the current generation could not be successfully stored into a block. Thus, at step 420, the NVM interface may determine whether there are additional blocks in which the current generation of the NV pre-boot information may be stored. This may involve determining whether the NVM interface has already unsuccessfully attempted to store the current generation of the NV pre-boot information into all of the blocks of the IC die, including by erasing the original block in which the previous generation of the NV pre-boot information resided. If, at step 420, the NVM interface determines that no more blocks are available to try, the NVM interface may not be able to store the current generation into the presently selected IC die. Process 400 may therefore move to step 434 (described below) to allow the NVM interface to store the current generation of the NV pre-boot information into another IC die.

If, at step 420, the NVM interface determines instead that there are additional blocks in the presently selected IC die, process 400 may move to step 422, and the NVM interface may select a new or next block in which to store the current generation. The NVM interface may determine at step 424 whether the new block has been marked as a bad block. If so, the NVM interface may skip programming the current generation in this new block. Process 400 may therefore return to step 420 so that the NVM interface may determine whether another block may be used to store the current generation. This way, the NVM interface may continue selecting new blocks in the NV pre-boot storage partition until an available, usable block in the partition is selected or until no additional blocks remain in the partition to try.

If, at step 424, the NVM interface determines that the new block is not marked as a bad block, process 400 can continue to step 426 and the NVM interface may erase the new block. If, at step 428, the NVM interface confirms that the erase operation was successful, the new block may be usable to store the current generation of the NV pre-boot information. Also, the successful erase operation may cause the closing index to become unsealed, and therefore the new block may be referred to as the presently unsealed block. If the erase operation is not successful, process 400 may move back to step 420 to determine whether another block may be used to store the current generation of the NV pre-boot information.

After confirming that an erase operation is successful at step 428, process 400 can move to step 412, discussed above. At step 412, the NVM interface may program the current generation into the new, presently unsealed block, such as in the first page or set of pages of the block.

Continuing to step 414, if the NVM interface determines that the current generation of the NV pre-boot information has been successfully programmed into the presently unsealed block (e.g., via a readback verification process), process 400 can continue to step 430. At step 430, the NVM interface may determine whether the current generation of the NV pre-boot information was stored at step 412 in a different block than the original block in which the previous generation may or may not still reside. The NVM interface may not use a different block if the current generation fit into the original block or if the NVM interface looped through all of the other blocks but found that the current generation could be stored only by erasing the original block. Otherwise, if the NVM interface needed to use a different block, the NVM interface may seal the closing index of the original block at step 432 to indicate that the original block contains only obsolete generations of the NV pre-boot information.

Thus, as indicated by steps 414, 430, and 432, the NVM interface may be configured to seal the original block, if necessary, only after the current generation has been successfully programmed into the NAND-type non-volatile memory. This way, if only one block in the IC die (e.g., the original block) is able to reliably store information, and therefore the NVM interface never uses a different block at step 430, the NVM interface may continually leave the original block unsealed. This may be more efficient than having the NVM interface seal the closing index each time that the original block fills up only to find that the original block needs to be immediately unsealed (i.e., erased).

In some embodiments, rather than having separate sealing steps 418 and 432, the NVM interface may seal all unsealed blocks that do not store the current generation of the pre-boot information in one step (or in multiple consecutive steps). For example, after a successful program operation of the current generation, the NVM interface may be configured to seal any unsealed blocks except for the block containing the newly programmed current generation.

After the current generation has been successfully programmed into the presently selected IC die, or after the NVM interface determines at step 420 that the current version may not be programmed into the presently selected IC die, process 400 may move to step 434. At step 434, the NVM interface may determine whether there are additional IC dies in the NV pre-boot storage partition in which to program the current generation of the NV pre-boot information. For example, the NVM interface may determine whether the current generation has been programmed into every IC die. If there are additional IC die to program the current generation, process 400 may move back to step 406 (described above) so that the NVM interface can select another IC die in the NV pre-boot storage partition in which to program the current generation of the NV pre-boot information. Otherwise, process 400 may end at step 436.

Process 500 is a flowchart of an illustrative process for retrieving NV pre-boot information from the NV pre-boot storage partition of a NAND-type non-volatile memory, such as from NV pre-boot storage partition 260 of NAND-type NVM 200 of FIG. 2. Process 500 may be executed during bootup of the electronic device so that, for example, a bootloader may use the NV pre-boot information while loading the operating system of the electronic device.

Process 500 may begin at step 502. At step 504, the NVM interface may select an IC die from which to retrieve NV pre-boot information. The NVM interface may perform step 504, for example, in response to receiving a request from the bootloader (e.g., the first and/or second stage bootloader) or the operating system to read from a NV pre-boot storage. Then, at step 506, the NVM interface may select the last block of the NV pre-boot storage partition for the selected IC die. This way, the NVM interface can examine the closing indices of the blocks in the IC die in reverse order. In other embodiments, the NVM interface may instead select the first block of the IC die in order to examine the blocks in forward order.

At step 508, the NVM interface may determine whether the presently selected (i.e., last) block in the selected IC die is marked as a bad block. If the NVM interface determines that the block is marked as a bad block, the NV pre-boot information may not be stored in this bad block. Process 500 may therefore move to step 510. At step 510, the NVM interface can determine whether the presently selected block is the first block of the NV pre-boot storage partition. If the presently selected block (e.g., the last block) is not the first block, the NVM interface may select, at step 512, a previous block (e.g., the second to last block) in the NV pre-boot storage partition for the presently selected IC die. Process 500 may then move back to step 508 so that the NVM interface can determine whether the newly selected block has been marked as a bad block. If, at step 510, the NVM interface instead determines that the presently selected block is the first block in the NV pre-boot storage partition, process 500 may continue to step 530, discussed below.

Using steps 508, 510, and 512, the NVM interface may not attempt to read from a block in the NV pre-boot storage partition of a selected IC until the block is determined to be useable (i.e., not marked as a bad block). Once, at step 508, the NVM interface determines that the presently selected block is not marked as a bad block, process 500 can continue to step 514. At step 514, the NVM interface may read the closing index of the presently selected block. As described above in connection with FIG. 3, the closing index may be unsealed (e.g., erased) if the presently selected block stores the current generation of the NV pre-boot information or if there was a problem when trying to seal the closing index.

At step 516, the NVM interface may determine whether the closing index read at step 514 is sealed. This may involve determining whether the last page or set of pages in the presently selected block is programmed with some suitable value. If so, the presently selected block may not include the current generation of the NV pre-boot information. Process 400 may move to step 510, discussed above, to find a previous block to continue the search for the current generation. If, at step 516, the NVM interface instead determines that the closing index is unsealed, the presently selected block potentially includes the current generation of the NV pre-boot generation. Thus, process 500 may move to step 518, where the NVM interface may scan the pages of the presently selected block in reverse order. The NVM interface may scan through the pages to find a valid generation of pre-boot information. For example, a valid generation of NV pre-boot information may be encoded using a particular error correction code (ECC) and may have a particular underlying format for storing NV pre-boot data and NV pre-boot metadata. Thus, at step 518, the NVM interface may scan through the pages of the presently selected block to determine whether any of the pages store information meeting the criteria for a valid generation.

The NVM interface may scan through the pages of the presently selected block in reverse order, because this way, the first valid generation that the NVM interface encounters may be the youngest generation of the NV pre-boot information stored in that block. If, at step 520, the NVM interface does not find a valid generation of NV pre-boot information in the presently selected block, process 500 may move to step 510 to start trying another block. Otherwise, at step 522, the NVM interface may determine whether the valid generation found is the youngest generation found thus far in the presently selected IC die. If not, the valid generation found at step 518 may be an obsolete generation of the NV pre-boot information, and process 500 may move to step 510 to begin trying another block.

If, at step 522, the NVM interface instead determines that the valid generation found at step 518 is the youngest found in the IC die thus far, the NVM interface may maintain the memory location of this youngest valid generation at step 524. The NVM interface may keep track of this memory location (e.g., block and page in the IC die) in place of a previously maintained memory location, which may store what had until now been the youngest generation found. This way, if the memory location turns out to be where the current generation is stored, the NVM interface can determine where to store a next generation of the NV pre-boot information when the time to commit a new generation. For example, as discussed above in connection with FIG. 4, the NVM interface can store the next generation in the next page or set of pages.

Following step 524, the NVM interface may determine, at step 526, whether the valid generation found at step 518 is the youngest generation found overall. That is, the NVM interface may determine whether the valid generation is the youngest generation found amongst all of the IC dies searched thus far. If not, process 500 may continue to step 510 where the NVM interface may start searching for the current generation in another block. If so, the valid generation is potentially the current generation of the NV pre-boot information. Thus, at step 528, the NVM interface may maintain (e.g., store) the valid generation in place of what had been the youngest valid generation identified up to this point. Process 400 may then continue to step 510 to start trying another block (e.g., to determine whether another block has an even younger valid generation).

As described above, at step 510, the NVM interface may determine whether the presently selected block is the first block in the presently selected IC die. If so, there may be no more blocks in the present IC die to search for the current generation of the NV pre-boot information. Thus, process 500 may move to step 530, and the NVM interface may determine whether there are any IC dies that the NVM interface has yet to search through for the current generation of the NV pre-boot information. If, at step 530, the NVM interface determines that there are more IC die, process 500 may move back to step 504 so that the NVM interface may select another IC die. Thus, using step 530, the NVM interface can ensure that all of the IC dies in the NV pre-boot storage partition are considered when searching for the NV pre-boot information. This may be important, as there may be scenarios where only one of the IC dies stores the current generation.

If, at step 530, the NVM interface determines that all of the IC dies in the NV pre-boot storage partion have been considered, process 500 may continue to step 532. At step 532, the NVM interface may provide the overall youngest valid generation being maintained from step 528 to the bootloader (e.g., first or second stage bootloader) or to the operating system that requested the NV pre-boot data. For example, the NVM interface may extract or obtain the NV pre-boot data from the overall youngest valid generation of the NV pre-boot information, and may provide the NV pre-boot data to the bootloader or the operating system. Thus, when providing the NV pre-boot data to the bootloader or operating system, the NVM interface may operate under the assumption that the youngest valid generation found amongst all of the IC dies corresponds to the current generation.

In some embodiments, the NVM interface may not be able to retrieve the current generation of the NV pre-boot information from any of the IC die. This may occur, for example, if the electronic device loses power when the NV pre-boot information was originally programmed to the NAND-type NVM or due to brownout. As made apparent above, the NVM interface may still be able to retrieve a previous version of the NV pre-boot information (e.g., NV PB vN-1) from the NAND-type non-volatile memory, because the previous generation may be the youngest overall generation found using process 500. Thus, even though the electronic device may not be able to work with the most current version of the NV pre-boot information, the electronic device may still be able to bootup properly.

It should be understood that processes 400 and 500 of FIGS. 4 and 5 are merely illustrative. Any of the steps of these processes may be removed, modified, or combined, and any additional steps may be added, without departing from the scope of the invention. For example, FIGS. 4 and 5 are described above for embodiments in which the NVM interface may serially process each block or each IC die so that data is stored in or retrieved from one block or one IC die before moving to do the same with another block or IC die. It should be understood that, in other embodiments, processing of different blocks or IC die may be performed concurrently or substantially concurrently (e.g., in a pipelined manner).

The described embodiments of the invention are presented for the purpose of illustration and not of limitation.

What is claimed is:

1. A method of storing NV pre-boot information in a NAND-type non-volatile memory, wherein the NAND-type non-volatile memory comprises a plurality of integrated circuit die each having a plurality of blocks, the method comprising:
    allocating a portion of the blocks from each of the integrated circuit die for storing NV pre-boot information;
    programming a first generation of the NV pre-boot information in a first erased memory location within the allocated portion of each of the integrated circuit die; and
    storing a second generation of the NV pre-boot information in a second erased memory location within the allocated portion of each of the integrated circuit die.

2. The method of claim 1, wherein the first erased memory location of at least one of the integrated circuit die is located in a first block, and wherein the storing comprises, for the at least one of the integrated circuit die:
    determining that the second generation fits into the first block with the first generation; and
    programming the second generation into the second erased memory location responsive to the determining, wherein the second erased memory location is located in the first block.

3. The method of claim 1, further comprising selecting an available memory location adjacent to the first erased memory location as the second erased memory location, wherein the storing is performed responsive to the selecting.

4. The method of claim 1, wherein the first erased memory location of at least one of the integrated circuit die is located in a first block, and wherein the storing comprises, for the at least one of the integrated circuit die:
    determining that the second generation does not fit into the first block with the first generation;
    selecting, from within the allocated portion of blocks, a second block having at least one erased memory location;
    erasing the second block; and
    programming the second generation into the second erased memory location in response to the selecting, wherein the second erased memory location is located in the erased second block.

5. The method of claim 4, further comprising, for the at least one of the integrated circuit die:
    programming a closing index of the first block to indicate that the second generation does not reside in the first block.

6. The method of claim 4, wherein the storing further comprises, for the at least one of the integrated circuit die:
    in response to the selecting, determining that the second block is not marked as a bad block, wherein the programming is performed responsive to the determining.

7. The method of claim 1, further comprising, for at least one of the integrated circuit die:
    determining whether the second generation has been successfully stored in the second erased memory location, wherein the second erased memory location is located in a particular block within the first portion of blocks;

selecting a third erased memory location from the particular block responsive to determining that the second generation was not successfully stored in the second memory location; and
programming the second generation into the third erased memory location.

8. The method of claim 1, wherein the NV pre-boot information comprises NV pre-boot data generated by a first instance of an operating system to use in booting up a second instance of the operating system.

9. The method of claim 8, wherein the NV pre-boot information further comprises NV pre-boot metadata used to manage physical storage of the NV pre-boot information in the NAND-type non-volatile memory.

10. The method of claim 1, wherein:
the NAND-type non-volatile memory comprises a NAND flash memory;
the first erased memory location of each of the integrated circuit die comprises at least a first page of the NAND flash memory; and
the second erased memory location of each of the integrated circuit die comprises at least a second page of the NAND flash memory.

11. An electronic device comprising:
a NAND-type non-volatile memory comprising at least first and second integrated circuit ("IC") die, wherein the first IC die comprises a first plurality of blocks and the second IC die comprises a second plurality of blocks;
a non-volatile memory interface operable to access the NAND-type non-volatile memory to store NV pre-boot information, wherein the non-volatile memory interface is configured to:
generate a first version of the NV pre-boot information;
program the first version of the NV pre-boot information into a first block of the first plurality of blocks;
program the first version of the NV pre-boot information into a second block of the second plurality of blocks;
generate a second version of the NV pre-boot information;
obtain the second version of the NV pre-boot information with the first version of the NV pre-boot information into the first block; and
program the second version of the NV pre-boot information with the first version of the NV pre-boot information into the second block.

12. The electronic device of claim 11 wherein:
the non-volatile memory interface generates the first version of the NV pre-boot information responsive to receiving a first version of NV pre-boot data from an operating system; and
the non-volatile memory interface generates the second version of the NV pre-boot data information responsive to receiving a second version of NV pre-boot data from the operating system.

13. The electronic device of claim 11, wherein a portion of the first plurality of blocks and a portion of the second plurality of blocks are allocated for storing the NV pre-boot information, and wherein the non-volatile memory interface is further configured to:
select the first block from amongst the portion of blocks in the first IC die;
program the first version and the second version of the NV pre-boot information into the selected first block of the first IC die;
choose the second block from amongst the portion of blocks in the second IC die; and
program the first version and the second version of the NV pre-boot information into the chosen second block of the second IC die.

14. The electronic device of claim 11, wherein the non-volatile memory interface is further configured to:
generate a third version of the NV pre-boot information;
determine whether the third version fits into the first block with the first and second versions of the NV pre-boot information;
program the third version of the NV pre-boot information into the first block with the first and second versions of the NV pre-boot information responsive to determining that the third version fits into the first block;
program the third version of the NV pre-boot information into a third block of the first plurality of blocks responsive to determining that the third version does not fit into the first block, wherein the first version and the second version of the NV pre-boot information are maintained in the first block; and
program the third version of the NV pre-boot information in one of the blocks of the second IC die.

15. The electronic device of claim 11, wherein the NAND-type non-volatile memory comprises a NAND flash memory.

16. The electronic device of claim 11, wherein the NV pre-boot information comprises at least one of boot parameters, environment variables, panic information, and argument vectors, and wherein the NV pre-boot information is usable by the electronic device during bootup of an operating system.

17. A method of booting an electronic device using NV pre-boot data, the electronic device comprising a NAND-type non-volatile memory having at least a first integrated circuit ("IC") die comprising a first plurality of blocks and a second IC die comprising a second plurality of blocks, the method comprising:
identifying at least one block in the first IC die that potentially includes a current version of the NV pre-boot data;
performing a first scan, in reverse order, of memory locations in the at least one block in the first IC die for a valid version of the NV pre-boot data;
selecting at least one block from the second IC die that potentially includes the current version of the NV pre-boot data;
executing a second scan, in reverse order, of memory locations in the at least one block in the second IC die for a valid version of the NV pre-boot data;
determining a youngest valid version of the NV pre-boot data from the first and second scan; and
booting up the electronic device using the youngest valid version of the pre-boot data.

18. The method of claim 17, wherein:
the identifying comprises examining a closing index of at least a portion of the first plurality of blocks in the first IC die; and
the selecting comprises analyzing a closing index of at least a portion of the second plurality of blocks in the second IC die.

19. The method of claim 18, wherein the examining and the analyzing each comprises:
determining whether the closing index of a particular block is in a programmed state; and
determining that the particular block potentially includes the current version of the NV pre-boot data in response to determining that the closing index is in a programmed state.

20. The method of claim 18, wherein:
the identifying further comprises skipping over the examining for blocks in the first plurality of blocks marked as bad blocks; and
the selecting further comprises skipping over the analyzing for blocks in the second plurality of blocks marked as bad blocks.

21. The method of claim 17, wherein:
the performing comprises scanning the first plurality of blocks until a valid version of the NV pre-boot data is encountered; and
the executing comprises scanning the second plurality of blocks until a valid version of the NV pre-boot data is encountered.

22. The method of claim 17, wherein the NV pre-boot data is generated by a first instance of an operating system for use in starting up a second instance of the operating system.

23. A non-volatile memory interface, comprising:
a bus controller for communicating with a NAND-type non-volatile memory, wherein the NAND-type non-volatile memory comprises at least first and second integrated circuit ("IC") die, each of the first and second IC die comprising a plurality of blocks allocated for storing multiple generations of NV pre-boot information; and
a processor for controlling the bus controller and configured to:
identify a first valid generation of the NV pre-boot information from the allocated blocks of the first IC die;
identify a second valid generation of the NV pre-boot information from the allocated blocks of the second IC die;
select a younger of the first and second valid generations;
run a second stage bootloader using the younger version of the NV pre-boot information.

24. The non-volatile memory interface of claim 23, wherein the first valid generation is a youngest valid generation found in the first IC die, and wherein the second valid generation is a youngest valid generation found in the second IC die.

25. The non-volatile memory interface of claim 23, wherein the NAND-type non-volatile memory comprises a NAND flash memory, and wherein the first and the second valid generations are each stored in at least one page of the NAND flash memory.

26. The non-volatile memory interface of claim 23, wherein the NV pre-boot information comprises at least one of boot parameters, environment variables, panic information, and argument vectors.

* * * * *